United States Patent
Sauer

(10) Patent No.: US 9,489,317 B2
(45) Date of Patent: Nov. 8, 2016

(54) METHOD FOR FAST ACCESS TO A SHARED MEMORY

(71) Applicant: Apple Inc., Cupertino, CA (US)

(72) Inventor: Matthias Sauer, San Jose, CA (US)

(73) Assignee: Apple Inc., Cupertino, CA (US)

( * ) Notice: Subject to any disclaimer, the term of this patent is extended or adjusted under 35 U.S.C. 154(b) by 92 days.

(21) Appl. No.: 14/497,795

(22) Filed: Sep. 26, 2014

(65) Prior Publication Data

US 2016/0092377 A1    Mar. 31, 2016

(51) Int. Cl.
*G06F 12/14* (2006.01)
*G06F 1/32* (2006.01)

(52) U.S. Cl.
CPC ......... *G06F 12/1458* (2013.01); *G06F 1/3243* (2013.01); *G06F 2212/1028* (2013.01)

(58) Field of Classification Search
CPC . G06F 21/79; G06F 12/1441; G06F 12/1466
See application file for complete search history.

(56) References Cited

U.S. PATENT DOCUMENTS

| | | | |
|---|---|---|---|
| 7,055,038 B2 | 5/2006 | Porter et al. | |
| 8,356,361 B2 | 1/2013 | Werner et al. | |
| 8,775,824 B2 | 7/2014 | Kershaw et al. | |
| 2004/0064457 A1 | 4/2004 | Zimmer et al. | |
| 2005/0177712 A1* | 8/2005 | Kadi | H04W 28/14 713/150 |
| 2008/0189500 A1* | 8/2008 | Jennings | G06F 21/71 711/164 |
| 2010/0057960 A1* | 3/2010 | Renno | G06F 21/79 710/110 |
| 2011/0035575 A1* | 2/2011 | Kwon | G06F 9/4405 713/2 |

\* cited by examiner

*Primary Examiner* — Ryan Bertram
*Assistant Examiner* — Edmund Kwong
(74) *Attorney, Agent, or Firm* — Meyertons, Hood, Kivlin, Kowert & Goetzel, P.C.

(57) ABSTRACT

A system, a method, and an apparatus are disclosed. In an embodiment, a system includes a host processor with a communications unit, a memory coupled to the communications unit, and a coprocessor coupled to the communications unit. The memory may include at least a first area and a second area. The coprocessor may be configured to request access to the first area of the memory via the communications unit. The communications unit may be configured to verify an identity of the coprocessor, and grant access to the first area of the memory responsive to a positive identification of the coprocessor.

20 Claims, 5 Drawing Sheets

METHOD FOR FAST ACCESS TO A SHARED MEMORY

BACKGROUND

1. Technical Field

Embodiments described herein are related to the field of computing systems and, more particularly, to managing shared memory in a system.

2. Description of the Related Art

A variety of electronic devices are now in daily use with consumers. Particularly, computing devices have become ubiquitous. As used herein, a computing device may refer to any electronic device that includes a processor, memory, a user interface and a display. Examples of personal computing devices may include desktop computers, personal digital assistants (PDAs), smart phones that combine phone functionality and other computing functionality, tablets, laptops, net tops, smart watches, wearable electronics, etc.

Some computing devices include a main memory that may be under control of a main processor. Other processors, such as various coprocessing units for example, that may utilize the main memory may be required to send memory commands via the main processor. Such a memory architecture may require the main processor to be in a fully operational mode in order to process memory commands. If the main processor is in a reduced power mode at the time a coprocessor submits a memory command, then delays may be experienced while the main processor recovers from the reduced power mode to process the memory commands. Furthermore, additional power may be consumed since the main processor is in a full operational mode to process the commands.

Other systems may avoid the delays and power consumption increases by including a second memory for use by one or more coprocessors. A coprocessor may be capable of directly accessing this second memory, thereby eliminating a need for the main processor to recover from the reduced power mode. Implementing this architecture, however, may increase system cost and increase a size of a circuit board used.

SUMMARY OF THE EMBODIMENTS

Various embodiments of communications system are disclosed. Broadly speaking, a system, an apparatus, and a method are contemplated in which the system includes a host processor which includes a communications unit, a memory coupled to the communications unit, and a coprocessor coupled to the communications unit. The memory may include at least a first area and a second area. The coprocessor may be configured to request access to the first area of the memory via the communications unit. The communications unit may be configured to verify an identity of the coprocessor, and grant access to the first area of the memory responsive to a positive identification of the coprocessor.

In a further embodiment, the communications unit may be further configured to operate while at least a portion of the host processor is operating in a reduced power mode. In another embodiment, the coprocessor may be further configured to request access to the first area of the memory while the host processor is operating in the reduced power mode. In one embodiment, the coprocessor may be further configured to copy data from the first area of the memory to a local memory coupled to the coprocessor.

In another embodiment, to verify the identity of the coprocessor the communications unit may be further configured to compare a password from the coprocessor to a password stored in the first area of the memory. In an embodiment, the communications unit may be further configured to calculate a hash value of at least a portion of data stored in the first area of the memory, and to verify the identity of the coprocessor, the communications unit may be further configured to compare a password received from the coprocessor to the hash value. In one embodiment, the host processor may be configured to access the second area of the memory while the coprocessor is accessing the first area of the memory.

BRIEF DESCRIPTION OF THE DRAWINGS

The following detailed description makes reference to the accompanying drawings, which are now briefly described.

Figure 1:
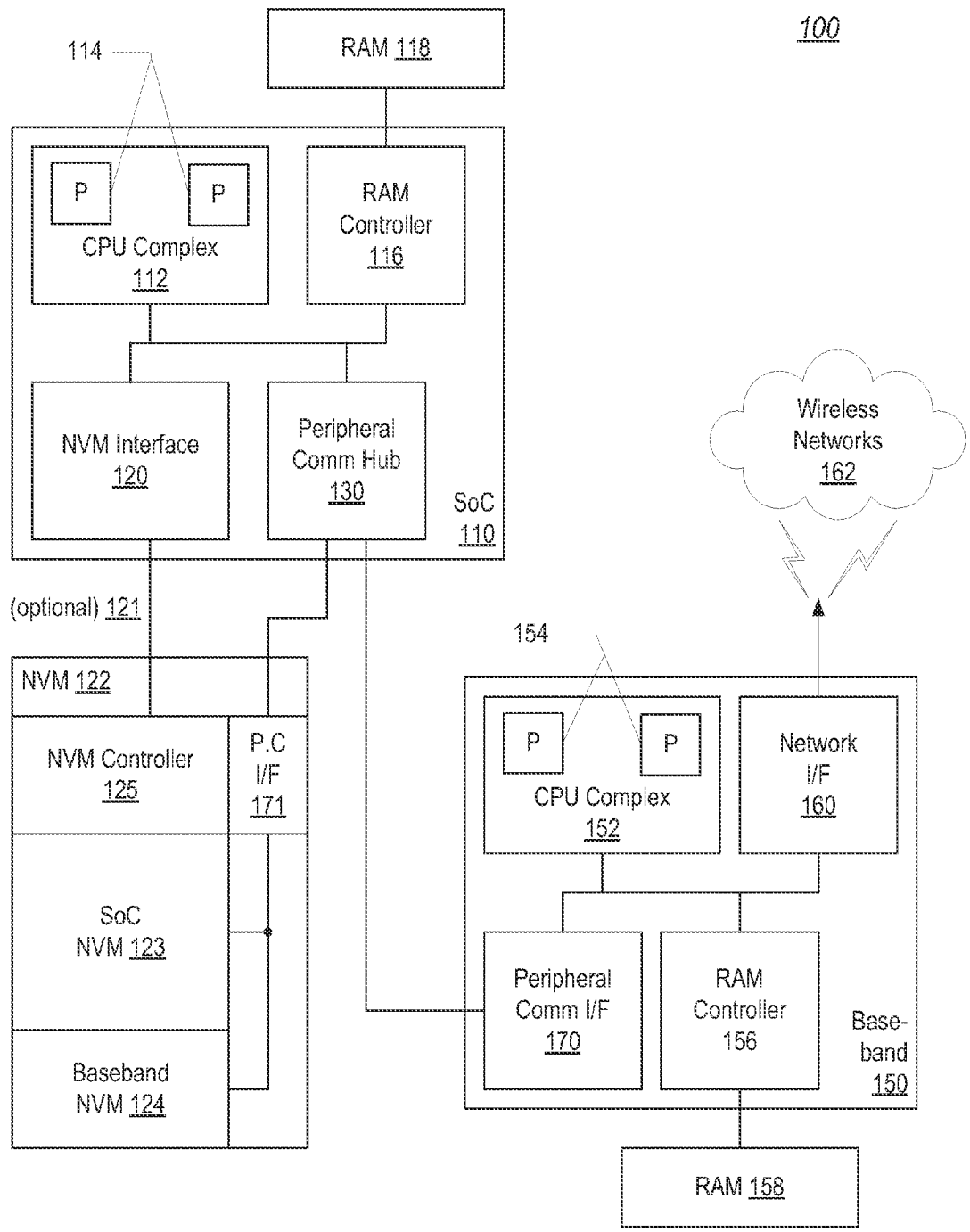
FIG. 1 illustrates a block diagram of an embodiment of a computing system.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

In a computing system with a main host processor and one or more dependent coprocessors, such as wireless modems, for example, some of the host processor's resources, such as, e.g., a main memory system, may be shared between the host processor and the coprocessors. In such systems that share the main memory, program code and data for a coprocessor may be stored in the main memory system. The program code and data for the coprocessor may then be copied into a local working memory of the coprocessor. This memory access may occur with direct involvement of a central processing unit (CPU) of the host processor or with involvement of a separate concurrent direct memory access (DMA) processor, either of which may be inactive at a time when the coprocessor attempts to gain access to the memory system. Activating the host CPU or the DMA processor may require time and/or increased power consumption.

In such a computing system, the program code and/or the data may also be confidential to the coprocessor. In such an embodiment, the confidential code or data should only be accessed by the coprocessor, and should not be made available to software applications running on the host processor or other unapproved coprocessors. In some embodiments, the coprocessor may generate confidential data that, likewise, should remain confidential to the coprocessor but that may be stored in the main memory system. Use of memory, which is controlled by the host processor for storing confidential code or data, may pose a security risk. For example, a malicious software application running on the host processor may be able to read, display, and/or send the confidential code or data to an unauthorized third party.

A local non-volatile memory may be attached to the coprocessor to store confidential code and/or data. Using a separate local non-volatile memory for this purpose, however, may increase an area of the computing system's circuit board and may increase a cost of the computing system.

The embodiments illustrated in the drawings and described below may allow for a coprocessor to access the main memory system while allowing a host processor or DMA processor to remain in a reduced power mode. Moreover, the illustrated embodiments may also prevent a host processor or other non-authorized coprocessor from accessing confidential data or program code belonging to the authorized coprocessor.

Computing System Overview

Turning now to FIG. 1, a block diagram of one embodiment of a computing system is illustrated. System 100 may correspond to any suitable type of computing system, such as a desktop or notebook computer, a computing tablet, portable media device, smartphone, or wearable device, for example. System 100 may include SoC 110 coupled to random access memory (RAM) 118, non-volatile memory (NVM) 122, and baseband processor 150. Components of SoC 110, as well as components of baseband processor 150, may be integrated onto a single semiconductor substrate as an integrated circuit "chip." In other embodiments, the components may be implemented on two or more discrete chips in a sub-system of system 100.

SoC 110 may function as a main, or host, application processor in system 100. SoC 110 may execute program code of a main operating system as well as program code of one or more applications. In the illustrated embodiment, the components of SoC 110 may include central processing unit (CPU) complex 112, RAM controller 116, NVM controller 120, and peripheral communications (comm) hub 130. RAM controller 116 may be coupled to RAM 118 and NVM interface 120 may be coupled to NVM 122 during use. Peripheral comm hub 130 may be coupled to both NVM 122 and baseband processor 150. CPU complex 112 may include one or more processors (P) 114. Processors 114 may form the CPU(s) of SoC 110.

Baseband processor 150 may manage connections to one or more wireless networks, such as cellular voice or data networks, or Wi-Fi™ networks. Components of baseband processor 150, in the current embodiment, may include CPU complex 152, RAM controller 156, network interface (I/F) 160, and peripheral bus interface (I/F) 170. RAM controller 156 may be coupled to RAM 158 during use. Network interface 160 may be wirelessly coupled to wireless network 170 during use. Peripheral comm interface 170 may be coupled to peripheral comm hub 130.

It is noted that a "component," as referred to herein, may be one or more predefined circuit blocks which provides a specified function within SoC 110 or baseband processor 150. Thus CPU complexes 112 and 152, RAM controllers 116 and 156, NVM controller 120, peripheral comm hub 130, network interface 160, and peripheral comm interface 170 may each be an example of a component.

As mentioned above, CPU complex 112 and CPU complex 152 may each include one or more processors (P 114 and P 154, respectively) that may serve as the respective CPU of SoC 110 or baseband processor 150. In addition to processors 112 and 154, each of CPU complexes 112 and 152 may further include other hardware such as L2 caches and/or one or more bus transceiver units that allow CPU complexes 112 and 152 to communicate to other components such as RAM controllers 116 or 156, respectively, for example.

Generally, a processor may include any circuitry configured to execute instructions defined in an instruction set architecture implemented by the processor. Processors may include multiple processor cores implemented on an integrated circuit with other components as a system on a chip (e.g., SoC 110) or other levels of integration. In various embodiments, processors 112 and processors 152 may implement any suitable instruction set architecture (ISA), such as, e.g., PowerPC™, or x86 ISAs, or a combination thereof. Processors may further encompass discrete microprocessors, processor cores and/or microprocessors integrated into multichip module implementations, processors implemented as multiple integrated circuits, etc.

RAM controllers 116 and 156 may generally include circuitry for receiving memory operations from the other components of SoC 110 or baseband processor 150 and for accessing RAM 118 or RAM 158 to complete the memory operations. RAM controllers 116 and 156 may each be independently configured to access any suitable type of RAM 118 or 158. For example, RAMs 118 and 158 may each independently comprise static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). RAM 118 and/or RAM 158 may include one or more RAM chips. RAM controllers 116 and 156 may each include queues for memory operations, for ordering (and potentially reordering) the operations and presenting the operations to RAM 118 or 158. RAM controllers 116 and 156 may further include data buffers to store write data awaiting storage to memory and read data awaiting return to the source of the memory operation.

NVM interface 120 may include circuitry for accessing NVM 122, via NVM bus 121. In some embodiments, NVM interface 120 may be coupled to NVM 122 via peripheral comm hub 130 and NVM bus 121 may be removed. NVM interface 120 may include data buffers for reading and writing data from/to NVM 122. In various embodiments, NVM interface 120 may interface with unmanaged or managed non-volatile memory. NVM 122 may, therefore, include managed or unmanaged non-volatile memory such as flash, ferroelectric RAM (FRAM or FeRAM), Resistive RAM (RRAM or ReRAM), magnetoresistive RAM (MRAM), or optical disk storage such as DVD-RW or CD-RW. NVM 122 may include one or more non-volatile memory chips. A managed component of NVM 122 may include a local memory controller that handles read/write operations as well as higher level tasks such as address mapping, wear leveling, and garbage collection. Unmanaged components of NVM 122 may include only basic read/write functions, leaving the higher level tasks to a component in SoC 110, such as NVM interface 120 or a processor 114 in CPU complex 112.

NVM 122 may be partitioned to include at least two ranges of memory locations. SoC NVM 123 may be a first range of memory locations for SoC 110. Baseband NVM 124 may be another range of memory locations for baseband processor 150. SoC NVM 123 may be a non-secure range of memory locations used for storing program code and data for SoC 110. "Non-secure" memory may refer to memory locations that do not require an authorization to be granted to a processor for accessing these memory locations. SoC NVM 123 may also store data for other components of system 100 not shown in FIG. 1. Baseband NVM 124 may be a secure range of memory locations for storing program code and/or data for baseband processor 150. "Secure" memory may refer to memory locations that do require an authorization to be granted before a processor may access the secure locations. A processor that fails to receive an authorization may be blocked from reading or writing the secure locations. In some embodiments, if a processor attempts to get authorization but fails, a notification may be sent to the operating system or to a security application running on SoC 110.

NVM 122 may also include NVM controller 125. NVM controller 125 may include one or more interfaces for communicating with SoC 110. At least one interface may allow communication to other devices coupled to the same interface, such as, for example, an interface to peripheral comm hub 130. In some embodiments, NVM controller may correspond to the local memory controller, mentioned above, that handles read/write operations as well as higher level tasks such as address mapping, wear leveling, and garbage collection. In other embodiments, these higher level tasks may be left to a resource in SoC 110 and NVM controller 125 may execute more basic read and write commands on the memory partitions. NVM controller 125 may, in some embodiments, be capable of executing independent memory commands on SoC NVM 123 and baseband NVM 124 in parallel.

It is noted that the term "parallel" as used herein, refers to two or more actions occurring, at least partially, within a same time period, i.e., such as one or more cycles of an associated clock signal. In some cases, a first action may begin before a second action begins and may end before the second action ends. In regards to NVM controller 125, a first read command for locations in SoC NVM 123 may begin, followed by a second read command for locations in baseband NVM 124. At least one memory location from each memory range may be read during a same time period. The first read command may be completed before the second read command completes. The term "parallel" is not intended to imply the two or more actions begin and end at precisely the same time.

Peripheral communications hub (also referred to herein as a "peripheral comm hub") 130 may implement a communications protocol for chip-to-chip communications in system 100. The communications protocol may be a proprietary protocol, designed for a specific application, or the protocol may be a standard, such as Peripheral Component Interconnect Express (PCIe), or Universal Serial Bus (USB). Peripheral comm hub 130 may be coupled to peripheral comm interface 170 in baseband processor 158 to provide for communication between SoC 110 and baseband processor 150. Peripheral comm hub 130 may also support communications between baseband processor 150 and other coupled devices, such as NVM 122, without requiring support from a processor 114 or NVM interface 120.

Peripheral comm interface 170 may provide a link from baseband processor 150 to SoC 110 via peripheral comm hub 130 as described above. Similarly, peripheral comm interface 171 may provide a link from NVM 122 to SoC 110, or more specifically, from NVM controller 125 to peripheral comm hub 130. Peripheral comm interfaces 170 and 171 may be able to initiate a communications link to peripheral comm hub 130 as well as receive instructions to establish a link. Peripheral comm interfaces 170 and 171 may, in some embodiments, have one or more associated endpoint nodes for establishing an address or identity within the communications protocol. An "endpoint node" may refer to a device identification (ID) number or an address used to identify any coupled device that is a potential sender or receiver of messages using the communications protocol. Peripheral comm hub 130 or another device using the communications protocol may send data and or commands to baseband processor 150 by addressing the data or commands to an endpoint node assigned to peripheral comm interface 170. In some embodiments, peripheral comm interface 171 may assign one endpoint node to SoC NVM 123 and another endpoint node to baseband NVM 124. In other embodiments, peripheral comm hub 130 may make the endpoint assignments. By using separate endpoint node assignments for SoC NVM 123 and baseband NVM 124, baseband processor 150 may be able to send a command to read data from baseband NVM 124 by addressing its associated endpoint node while SoC 110 sends a command in parallel to read data from SoC NVM 123 by addressing its associated endpoint node.

To facilitate communication with various other devices, network interface 160 may include one or more networking links, such as cellular protocols global system for mobile communications (GSM) and/or code division multiple access (CDMA). In addition or alternatively, network interface 160 may include a networking link to a wireless protocol, such as Wi-Fi™, for example. Network interface 160 may include links to communicate with other devices or data servers at either a local or global level.

It is noted that the number of devices of system 100 as well as the number of components for each illustrated device shown in FIG. 1, such as within SoC 110 or baseband processor 150, may vary from embodiment to embodiment. There may be more or fewer of each device/component than the number shown in FIG. 1. In addition, a number of connections from one device to another may vary.

Figure 2:
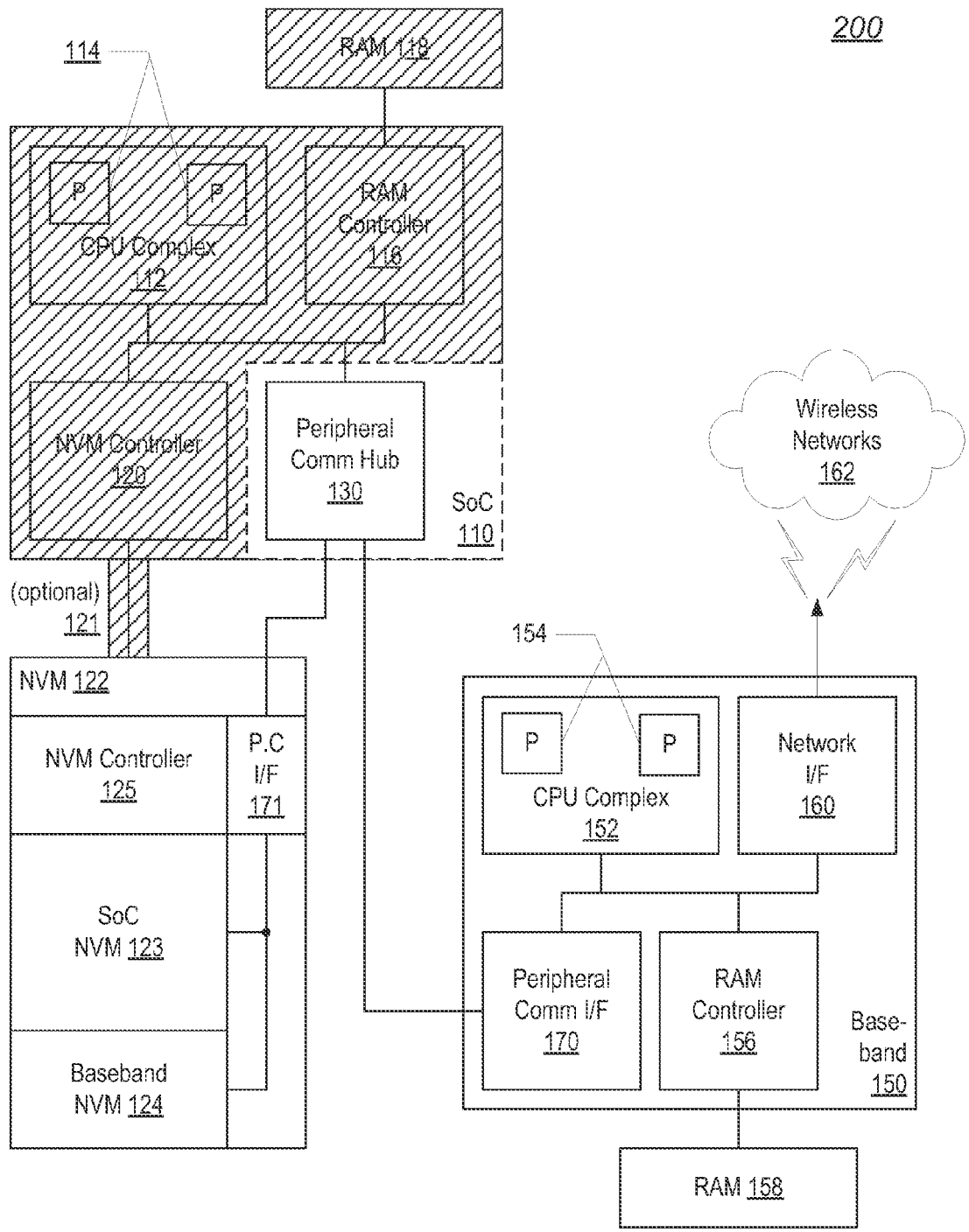
FIG. 2 illustrates the embodiment of the computing system of FIG. 1 in a reduced power state.

Turning now to FIG. 2, the computing system of FIG. 1 is shown again in a reduced power state as system 200. System 200 may include all the features of system 100. The cross hatched areas including RAM 118, NVM bus 121 and portions of SoC 110 may indicate a region of system 200 coupled to a first power domain. The non-cross hatched region, including NVM 122, baseband processor 150, RAM 158 and a portion of SoC 110, may indicate a region coupled to a second power domain. In some embodiments, each illustrated power domain may include a respective one or more power domains.

A power domain, as used herein, may refer to a component, a group of components, and/or subcomponents coupled to a common power supply signal. Generally, a power domain may be configured to receive a power supply signal (i.e. be powered on) or not receive power supply signal (i.e. be powered off) independent of other power domains. In some embodiments, power domains may be supplied with different supply voltage magnitudes concurrently. This independence may be implemented in a variety of fashions. For example, the independence may be implemented by providing separate power supply signal inputs from a power management unit, by providing power switches between the supply voltage inputs and components and controlling the power switches for a given domain as a unit, or a combination thereof. A given power domain may include a component of a device, such as NVM controller 120 in SoC 110 or may include an entire chip or group of chips, such as RAM 118 for example.

The first power domain, may, in the illustrated embodiment, be at a reduced voltage level, to conserve power, for example. CPU complex 112 and related components in the first power domain may be in a state of reduced or zero activity, i.e., in a "sleep" or "powered-down" mode. The devices and components in the second power domain may be awake and active. In some embodiments, peripheral comm hub 130 may be included in a power domain in SoC 110 in which power is always on when SoC 110 is receiving an adequate voltage level. This "always-on" power domain may keep a portion of SoC 110 components active while SoC 110 is otherwise powered-down. The always-on components may preserve an operating state of SoC 110 to allow for a faster recovery into an active mode from the powered-down mode. Some always-on components of SoC 110 may also support other devices in system 200 without having to awaken the powered-down portions.

Peripheral comm hub 130 may be included in the always-on power domain to enable coupled devices that are in a powered-on domain to communicate while CPU complex 112 and other components of SoC 110 are in the power-down mode. For example, baseband processor 150 may wake from a separate reduced power state and may require access to NVM 122 to load a software program or to retrieve configuration/initialization data for communicating to wireless networks 162. NVM 122 may remain active in an always-on power domain or may be in a separate power domain which may be activated by baseband processor 150 or by peripheral comm hub 130 responsive to a request from baseband processor 150. When NVM 122 is active, baseband processor 150 may, via peripheral comm interface 170 and peripheral comm hub 130, send a series of commands to NVM 122 to retrieve the necessary data from baseband NVM 124. Time and/or power may be saved by eliminating a need to wake CPU complex 112 from the power-down mode to facilitate the data transfer between NVM 122 and baseband processor 150.

It is noted that the computing system of FIG. 2 is merely an embodiment for demonstrative purposes. Other embodiments may include different components and different numbers of components in the powered-down and powered-on power domains. In some embodiments, a variety of power domains with varying voltage levels may be included.

Figure 3:
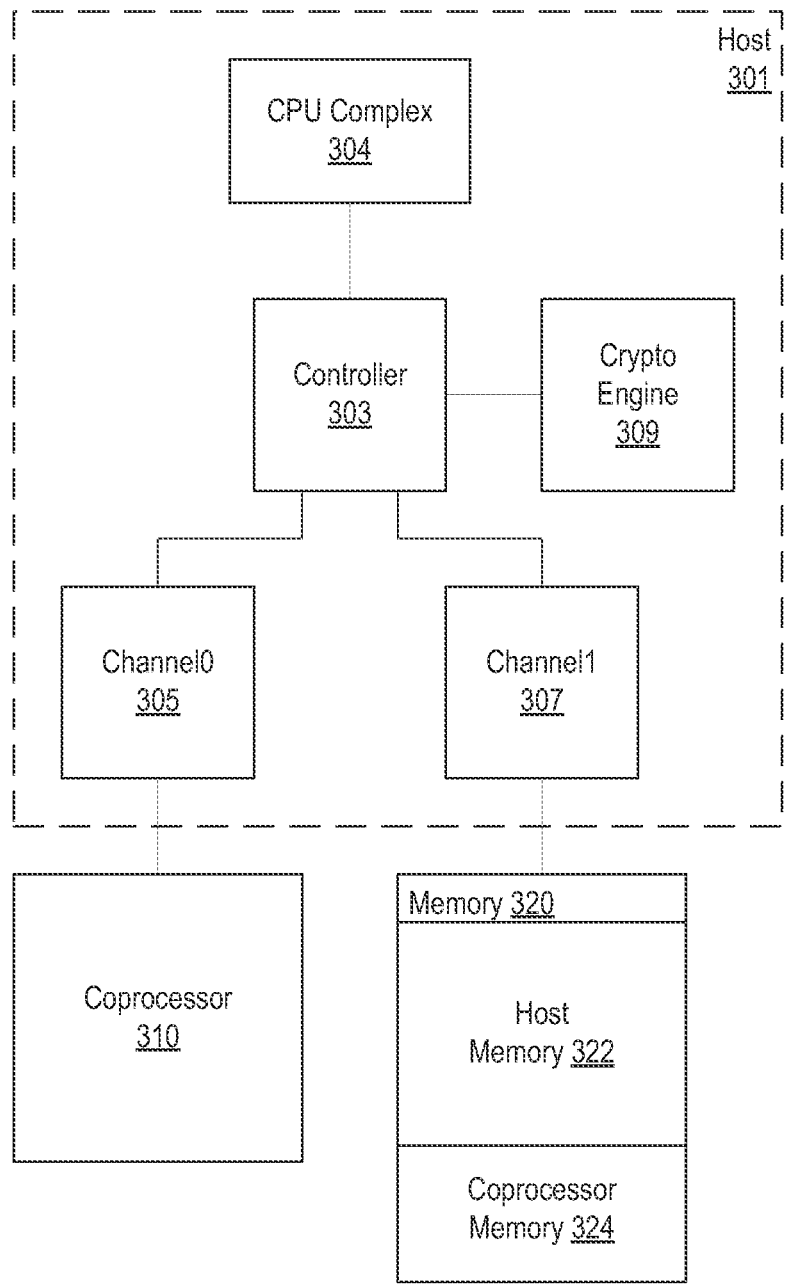
FIG. 3 illustrates a block diagram of another embodiment of a computing system.

Turning to FIG. 3, a block diagram of another embodiment of a computing system is illustrated. System 300 of FIG. 3 includes host 301 coupled to coprocessor 310 and memory 320. Host 301 may include controller 303 coupled to CPU complex 304, communications channel 0 (channel0) 305, communications channel 1 (channel1) 307, and cryptography (crypto) engine 309. Memory 320 may include host memory 322 and coprocessor memory 324.

Coprocessor 310 may correspond to any suitable processing device in a computing system. For example, coprocessor 310 may correspond to any of, but not limited to, a graphics processor, an audio processor, a general purpose microprocessor or microcontroller, a communications modem for a Wi-Fi™ network connection or a baseband processor for a cellular network connection. Coprocessor 310 may be coupled to host 301 via channel0 305.

Memory 320 may correspond to any suitable memory for use in a computing system. For example, memory 320 may correspond to one or more RAM chips as described in regards to RAM 118 or RAM 158 in FIG. 1, or may include one or more non-volatile memory chips, as described above in regards to NVM 122 in FIG. 1. In some embodiments, memory 320 may include a combination of RAM and non-volatile memory. Memory 320 may be partitioned into two or more regions, each region corresponding to a range of address locations. Host memory 322 may correspond to a first region and coprocessor memory 324 may correspond to a second region. In various embodiments, host memory 322 and/or coprocessor memory 324 may include protected memory address locations with access restricted to approved devices. At least a portion of coprocessor memory 324 may be restricted, for example, to access by coprocessor 310 and, in some embodiments, at least a portion of host memory 322 may be restricted to access by host 301. Other embodiments may include further memory partitions and a given protected address location may have more than one device approved for access. Protected memory locations (also referred to herein as secure memory locations) may be used for storing program code for an application that only the authorized device should execute, or for storing sensitive data such as, e.g., user passwords, encryption keys, device identification numbers, or wireless network access codes.

Memory 320 may be coupled to host 301 via channel 307. Each memory region may be assigned to an endpoint node of a communication protocol implemented by controller 303. In some embodiments, host memory 322 may be assigned to one endpoint node and coprocessor memory 324 may be assigned to another endpoint node. In other embodiments, if only a portion of memory locations in coprocessor memory 324 or host memory 322 are included in a protected region, then this protected region may be assigned to a separate endpoint node than unprotected regions.

Host 301 may correspond to a main processor or SoC in a computing system, similar to SoC 110 in FIG. 1. For the purpose of clarity, some components of host 301 are not shown in FIG. 3. In some embodiments, host 301 may include multiple power domains, including at least one power domain that may remain at an operational voltage level when other power domains are at a lowered voltage level as part of a reduced power mode. CPU complex 304 may be similar to CPU complex 112 in FIG. 1 and may have similar functionality. CPU complex 304 may be included in a power domain that is at a lowered voltage level in the reduced power mode.

Controller 303 may be a part of a communications interface that enables host 301 to communicate with other devices in computing system 300. Controller 303 may implement a communications protocol in system 300. The communications protocol may be a proprietary protocol, designed for a specific application, or the protocol may be a standard, such as Peripheral Component Interconnect Express (PCIe), RapidIO® or Universal Serial Bus (USB). Controller 303 may be coupled to channel0 305 and channel1 307 and may communicate with coprocessor 310 through channel0 305 and with memory 320 via channel1 307.

Controller 303 may facilitate communications between CPU complex 304 and host memory 322 as well as communications between coprocessor 310 and coprocessor memory 324. Controller 303 may also provide a communications link between CPU complex 304 and coprocessor 310. As an example, coprocessor 310 may issue a read command to memory 320 for an address location in coprocessor memory 324. To issue the command, coprocessor 310 may request a communications link to be open between itself and controller 303 via channel0 305 if an existing link is not currently open. Opening the link to channel0 305 may include an initialization step to configure the link for a suitable data rate. Once the link has been opened, coprocessor 310 may issue the read command. Controller 303 may decode the target address or range of addresses included in the read command to determine if any of the addressed locations are in a protected memory range. In some embodiments, controller 303 may include memory mapping information, including information on protected memory ranges, independent from CPU complex 304. In other embodiments, this memory mapping information may be separate from controller 303, but accessible without intervention from CPU complex 304. Information on the protected memory ranges may, in some embodiments, be fixed by design in hardware, while in other embodiments, this information may be stored in a non-volatile memory in system 300 and read during a boot process of system 300.

If the target address does not correspond to a protected memory range, then controller 303 may forward the read command to memory 320. To forward the command, a communications link from channel1 307 to memory 320 may need to be opened if it is currently not open, similar to what was done for channel0. Once the link through channel1 307 is open, the read command may be sent to memory 320 and memory 320 may respond by sending the requested data to controller 303. Controller 303 may, in turn, reply back to coprocessor 310 with the requested data.

It is noted that "data rate," also commonly referred to as "bit rate," refers to a frequency with which bits of data are transmitted and received. A data rate is commonly expressed in terms of "bits per second" or "bps" and refers to a number of bits of data that may be transferred in one second.

If the target address does correspond to a protected memory range, then controller 303 may need to confirm that coprocessor 310 has permission to access the protected memory location. In some embodiments, controller 303 may request a key word or password from coprocessor 310. In other embodiments, coprocessor 310 may send the password with the read command knowing that the memory locations are protected. In either embodiment, failure to provide the password may result in controller 303 denying access to the memory locations.

In some embodiments, the password may correspond to a result of a hash function performed on data in the protected memory, such as, for example, one of the known secure hash algorithms (SHA). A "hash function" is an algorithm that may be applied to data of various sizes and that produces a "hash value" or "hash code." A given set of data will produce the same hash value each time the corresponding hash function is performed on the data. A hash function may be chosen in which a small change in the data set results in a noticeably different hash value. In response to receiving a password from coprocessor 310, controller 303 may calculate a hash value for data in the protected memory region that includes the target address. Crypto engine 309 may be used to perform some or all of the hash value calculation. In various embodiments, crypto engine 309 may include circuitry for calculating a specific hash algorithm, for calculating a variety of hash algorithms, or for calculating a portion of multiple hash algorithms. Controller 303 may compare the calculated hash value to the hash value received from coprocessor 310 and forward the read command on to memory 320 if the values match and deny access to memory 320 if the values do not match. In some embodiments, controller 303 may include a memory buffer for temporary storage of data being transferred. In such embodiments, the protected data on which the hash value is calculated may be stored in the buffer while the hash value is calculated. If the two hash values match, then the data requested by the read command may be sent from the buffer rather than reading memory 320 again, and if the hash values do not match, then the data in the memory buffer may be erased.

In other embodiments, the password received from coprocessor 310 may correspond to an encryption key. In such embodiments, crypto engine 309 may include circuitry for performing a specific encryption algorithm, for performing a variety of encryption algorithms, or for performing a portion of calculations for a variety of encryption algorithms. Data in the protected memory ranges may be encrypted using crypto engine 309. In response to receiving the read command and password from coprocessor 310, controller 303 may read the data from the target address or addresses via channel1 307 and decrypt the data using the encryption key corresponding to the password. The decrypted data may be sent to coprocessor 310 via channel0 305. If the password sent by coprocessor 310 was valid for the encrypted data, then coprocessor 310 may have received valid data. If, however, the password does not correspond to the encryption key used to encrypt the data before storage in memory 320, then coprocessor 310 may receive meaningless values which may not be used to recover the intended data.

Crypto engine 309 may not be included in all embodiments. In some embodiments, controller 303 may associate memory assigned to a given endpoint node to a limited number of other endpoint nodes. For example, one or more memory regions in coprocessor memory 324 may be assigned to a first endpoint node. Coprocessor 310 may be assigned to a second endpoint node. Controller 303 may only accept memory access requests to the first endpoint node from the second endpoint node. If CPU complex 304 is assigned to a third endpoint node, then memory access requests to the first endpoint node from CPU complex 304 may be rejected.

It is noted that computing system 300 of FIG. 3 is merely an example for demonstrating the disclosed concepts. Various other embodiments for identifying an approved device for accessing a protected memory region are known and contemplated. In various other embodiments, controller 303 may include more than two communication channels coupled to various devices.

Figure 4:
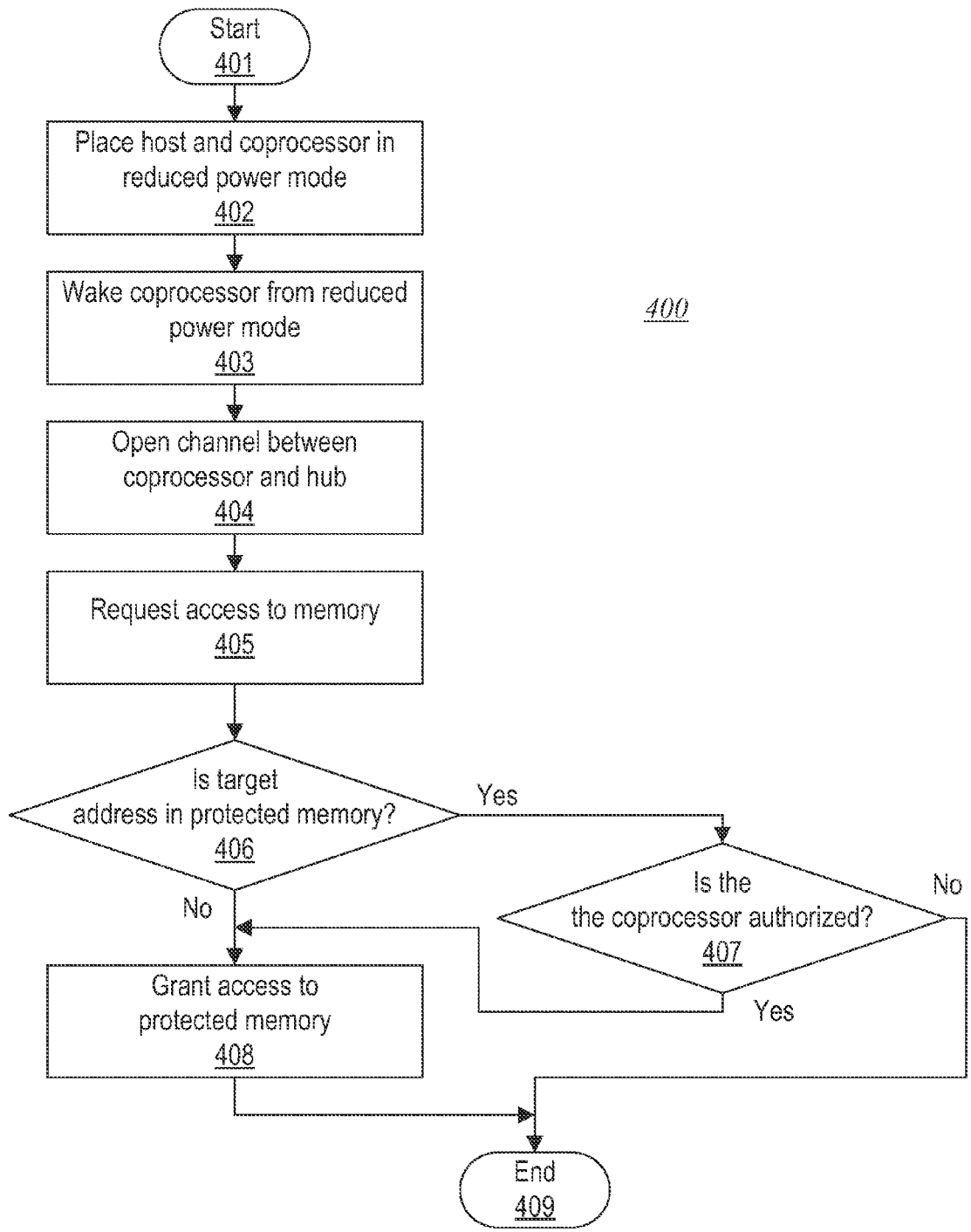
FIG. 4 is a flowchart illustrating an embodiment of a method for granting a coprocessor access to a main memory.

Turning next to FIG. 4, a flowchart is presented to illustrate an embodiment of a method for granting a coprocessor access to a main memory. Method 400 may be used in conjunction with a system, such as, for example, computing system 100 as illustrated in FIG. 1 or computing system 300 in FIG. 3. Referring collectively to system 300 in FIG. 3, and FIG. 4, the method may begin in block 401.

A host and a coprocessor may be placed in a reduced power mode (block 402). The host and the coprocessor may correspond to host 301 and coprocessor 310, respectively. Host 301 and coprocessor 310 may be placed in low power modes responsive to powering computing system 300 down in response to, for example, a user request or a predetermined period of inactivity.

Coprocessor 310 may be awoken from the reduced power mode (block 403). Coprocessor 310 may exit the reduced power mode in response to an interrupt from a source internal to coprocessor 310, such as a timer interrupt, or in response to an external interrupt such as a user input for example. In some embodiments, coprocessor 310 may exit the reduced power mode before host 301 can exit the reduced power mode. In other embodiments, host 301 may not be awoken when coprocessor 310 is awoken, such as, for example, if coprocessor 310 is awoken by an internal interrupt.

Coprocessor 310 may request a communication channel be opened to controller 303 (block 404). Coprocessor 310, upon awakening from the reduced power mode, may request channel0 305 be opened for communication. Opening the channel may include sending a message on channel0 305 using a default set of parameters for channel0 305. Controller 303 may perform a channel initialization process on channel0 305 in response to receiving the message from coprocessor 310. In other embodiments, part or all of the message may be corrupted due to an uninitialized state of channel0 305, and controller 303 may perform the channel initialization in response to receiving a corrupted message.

Coprocessor 310 may request access to coprocessor memory 324 (block 405). Once channel0 305 is open, coprocessor 310 may send a read command to controller 303. The read command may include an address or a range of addresses to be read from coprocessor memory 324.

The method may then depend on the target address of the read command (block 406). Coprocessor memory 324, or one or more memory regions in coprocessor memory 324, may be protected using one of various methods described in regards to FIG. 3, such as by using a hash function, by using encryption, or by associating endpoints of memory regions to endpoints of devices requesting access to the memory regions. Controller 303 may determine if the address or range of addresses in the read command include an address in a protected memory region. If no address in the read command targets a protected memory region, then the method may grant access to the memory in block 408. Otherwise, the method may move to block 407 to identify coprocessor 310.

The method then may depend on identifying coprocessor 310 (block 407). If controller 303 determines that a protected memory region is accessed by the read command, then controller 303 may determine if coprocessor 310 is authorized to access the protected memory region. More details of the authorization process will be provided below in regards to FIG. 5. If controller 303 determines coprocessor 310 is authorized to access the protected memory region, then the method may move to block 407 to grant access. Otherwise, the method may end in block 409.

Coprocessor 310 may be granted access the requested memory addresses (block 408). The read command may be sent from controller 303 to memory 320. In some embodiments, memory 320 may include a local memory controller which may receive the read command from controller 303 and respond with the requested data, which may then be sent to coprocessor 310 to complete the read command. Controller 303 may include a data buffer which may be used to temporarily store data begin transferred through controller 303. In such embodiments, memory 320 may not include a local memory controller or may have a local memory controller which may be limited to receiving read commands for smaller portions of data than included in the read command sent from coprocessor 310. Controller 303 may, in various embodiments, send multiple read commands that may be received and executed by memory 320, and store the data in the data buffer before forwarding the read data to coprocessor 310. The method may then end in block 409.

It is noted that, method 400 of FIG. 4 is merely an example. In other embodiments, a different number of operations may be included or different orders or operations may be employed. In some embodiments, some of the operations may be performed in parallel.

Figure 5:
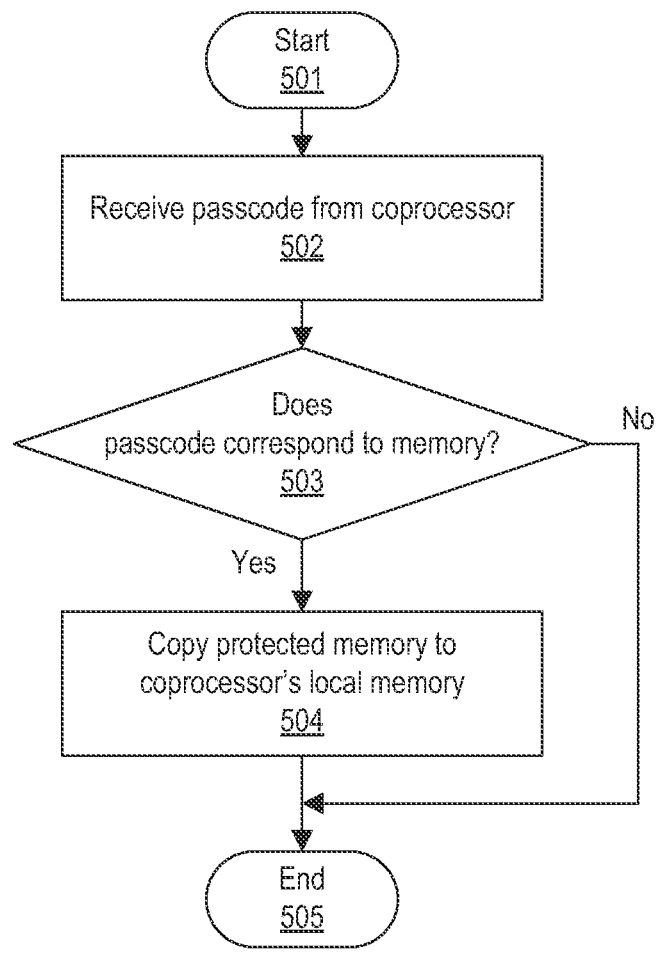
FIG. 5 is a flowchart illustrating an embodiment of a method for verifying an identity of a coprocessor.

Turning next to FIG. 5, a flowchart is shown illustrating an embodiment of a method for verifying an identity of a coprocessor. Method 500 may correspond to blocks 407 and 408 of method 400 in FIG. 4. Method 500 may be applied to a system such as computing system 300 in FIG. 3. Referring collectively to computing system 300 in FIG. 3 and method 500 of FIG. 5, the method may begin in block 501, with the controller 303 having determined a read command sent by coprocessor 310 targets a protected region of coprocessor memory 324.

Controller 303 may receive a passcode from coprocessor 310 (block 502). In some embodiments, coprocessor 310 may send a passcode as part of a read command, knowing that the read command targets a protected memory region. In other embodiments, coprocessor 310 may not know that the target address is in a protected memory region and may not send the passcode with the read command. In such an embodiment, controller 303 may request that coprocessor 310 send a passcode in order to complete the read command.

The method may then depend on the passcode (block 503). Controller 303 may use the received passcode, in one embodiment, to determine if the passcode corresponds to a hash value of the data in the memory region. Controller 303 may use crypto engine 309 to perform a hash function on the protected memory region to generate a hash value. The generated hash value may be compared to a hash value corresponding to the received passcode. If the hash values match, then coprocessor 310 may be authorized to access the protected memory. In another embodiment, controller 303 may use an encryption key corresponding to the received passcode to decrypt the requested data from the protected memory region. Data decrypted based on the received passcode may only be valid if a proper passcode was received and if an incorrect passcode was received, then the data may be invalid and have no use for the coprocessor.

In other embodiments, a passcode may not be required. Instead, controller 303 may include a table matching device endpoint nodes to memory endpoint nodes. In such an embodiment, controller 303 may grant coprocessor 310 access to the protected memory region only if the memory region's endpoint node corresponds to an endpoint node of coprocessor 310. It is also contemplated that a combination of these authentication processes may be used. If coprocessor 310 is authorized to access the protected memory region, then the method may move to block 504 to read data. Otherwise, the method may end in block 505.

Coprocessor 310 may receive access to the protected memory (block 504). Controller 303 may send the read command to memory 320. Memory 320 may reply to controller 303 with data corresponding to the requested addresses and controller 303 may forward the data to coprocessor 310. In some embodiments, memory 320 may require multiple read commands, as previously described, to access data from all memory locations targeted by the read command from coprocessor 310. Coprocessor 310 may store the received data in local RAM. The method may end in block 505.

It is noted that, method 500 illustrated in FIG. 5 is merely an example for demonstrating the disclosed concepts. In other embodiments, different operations and different orders of operations are possible and contemplated.

Numerous variations and modifications will become apparent to those skilled in the art once the above disclosure is fully appreciated. It is intended that the following claims be interpreted to embrace all such variations and modifications.

What is claimed is:

1. A system, comprising:
a host processor including a communications unit;
a memory coupled to the host processor via a first interface and a second interface, wherein the first interface is coupled to the communications unit, and wherein the memory includes at least a first area and a second area; and
a coprocessor coupled to the communications unit, wherein the coprocessor is configured to request access to the first area of the memory via the communications unit;
wherein the communications unit is configured to:
verify an identity of the coprocessor; and
grant access to the first area of the memory responsive to a positive identification of the coprocessor; and
wherein the host processor is configured to access the second area of the memory via the second interface while the coprocessor is accessing the first area of the memory via the first interface.

2. The system of claim 1, wherein the communications unit is further configured to operate while at least a portion of the host processor is operating in a reduced power mode, and wherein the coprocessor is further configured to request access to the first area of the memory while the host processor is operating in the reduced power mode.

3. The system of claim 1, wherein the first area of the memory and the second area of the memory are both non-volatile memory.

4. The system of claim 1, wherein the coprocessor is further configured to copy data from the first area of the memory to a local memory coupled to the coprocessor.

5. The system of claim 1, wherein to verify the identity of the coprocessor the communications unit is further configured to compare a first password received from the coprocessor to a second password stored in the first area of the memory.

6. The system of claim 1, wherein the communications unit is further configured to calculate a hash value of at least a portion of data stored in the first area of the memory, and wherein to verify the identity of the coprocessor, the communications unit is further configured to compare a password received from the coprocessor to the hash value.

7. The system of claim 1, wherein the coprocessor is further configured to request access to the second area of the memory; and wherein the communications unit is further configured to:
bypass verification of the identity of the coprocessor; and
grant access to the second area of the memory in response to the request for access the second area of the memory.

8. A method comprising:
requesting access, by a coprocessor via a communications interface, to a first area of a memory;
verifying, by a communications unit coupled to the communications interface, an identity of the coprocessor;
granting access, by a communications unit, to the first area of the memory responsive to positively identifying the coprocessor; and
accessing, by a host processor via a second memory interface, a second area of the memory while the coprocessor accesses the first area of the memory via a first memory interface.

9. The method of claim 8, wherein the communications unit is included on the host processor die.

10. The method of claim 9, further comprising opening a communications channel on the communications interface between the communications unit and the coprocessor while the host processor is inactive.

11. The method of claim 8, further comprising copying data from the first area of the memory to a local memory coupled to the coprocessor.

12. The method of claim 8, wherein verifying the identity of the coprocessor comprises comparing, by the communications unit, a first password received from the coprocessor to a second password stored in the first area of the memory.

13. The method of claim 8, wherein verifying the identity of the coprocessor comprises comparing a password from the coprocessor to a result of a hashing algorithm performed on at least a portion of data stored in the first area of the memory.

14. The method of claim 8, further comprising:
requesting access, by the coprocessor, to a second area of the memory;
bypassing, by the communications unit, verification of the identity of the coprocessor; and
granting, by the communications unit, access to the second area of the memory in response to the coprocessor requesting access to the second area.

15. An apparatus, comprising:
a processor;
a first interface to a coprocessor;
a second interface to a memory;
a third interface to the memory; and
a communications controller configured to:
receive a request from the coprocessor, via the first interface, to access a location in the memory;
verify an identity of the coprocessor responsive to a determination that access to the location in the memory is restricted; and
access the restricted location in the memory responsive to a positive identification of the coprocessor;
wherein the processor is configured to access another location in the memory, via the third interface, while the communications controller is accessing the restricted location in the memory.

16. The apparatus of claim 15, wherein the communications controller is included on a same die as the processor.

17. The apparatus of claim 16, wherein the communications controller is further configured to receive the request from the coprocessor via the first interface while the processor is in a reduced power state.

18. The apparatus of claim 15, further comprising a cryptography unit configured to compute a hash value of at least a portion of data stored in the memory, wherein the at least a portion of data includes data stored in the restricted location.

19. The apparatus of claim 18, wherein to verify the identity of the coprocessor, the communications controller is further configured to compare a password from the coprocessor to the hash value.

20. The apparatus of claim 15, wherein the communications controller is further configured to:
   receive another request from the coprocessor to access another location in the memory;
   bypass verification of the identity of the coprocessor in response to a determination that access to the another location in the memory is unrestricted; and
   access the another location in the memory in response to the determination that access to the another location in the memory is unrestricted.

* * * * *